US010935466B2

(12) United States Patent
Lin et al.

(10) Patent No.: US 10,935,466 B2
(45) Date of Patent: Mar. 2, 2021

(54) INTEGRATED TIRE SENSOR AND READER SYSTEM

(71) Applicant: The Goodyear Tire & Rubber Company, Akron, OH (US)

(72) Inventors: Cheng-Hsiung Lin, Hudson, OH (US); Carl Trevor Ross Pulford, Akron, OH (US); Peter Jung-min Suh, Copley, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 91 days.

(21) Appl. No.: 16/210,069

(22) Filed: Dec. 5, 2018

(65) Prior Publication Data
US 2019/0187027 A1    Jun. 20, 2019

Related U.S. Application Data

(60) Provisional application No. 62/608,123, filed on Dec. 20, 2017, provisional application No. 62/608,155, filed on Dec. 20, 2017.

(51) Int. Cl.
*B60C 23/04* (2006.01)
*G01M 17/02* (2006.01)

(52) U.S. Cl.
CPC ......... *G01M 17/02* (2013.01); *B60C 23/0408* (2013.01); *B60C 23/0433* (2013.01)

(58) Field of Classification Search
CPC .. G01M 17/02; G01M 17/022; G01M 17/021; G01M 17/027; G01M 17/025; G01M 17/024; G01M 1/02; G01M 1/225; G01M 17/007; G01M 17/03; G01M 17/10; G01M 1/16; G01M 1/326; G01M 3/40; G01M 7/08; G01M 17/0076;
(Continued)

(56) References Cited

U.S. PATENT DOCUMENTS 6,630,885 B2   10/2003 Hardman et al.
6,885,296 B2    4/2005 Hardman et al.
(Continued)

FOREIGN PATENT DOCUMENTS

EP   1309460 B1   8/2010
EP   2272688 B1   2/2012
(Continued)

OTHER PUBLICATIONS

EPO search report issued by the EPO dated Apr. 7, 2020.

*Primary Examiner* — Andre J Allen
(74) *Attorney, Agent, or Firm* — Edward T. Kennedy (57) ABSTRACT

An integrated tire sensor and reader system includes at least one sensor unit mounted a tire or a wheel. A reader is disposed remotely from the sensor unit. The sensor unit includes at least one sensor for measuring a parameter of the tire or wheel and an antenna for communicating with the reader. The sensor unit is configured to receive a radio frequency power signal from the reader and to transmit data to the reader. The reader includes an antenna for transmitting the radio frequency power signal to the sensor unit to actuate the one sensor unit. Upon actuation of the sensor unit, the sensor measures the parameter of the tire or wheel, and data from the sensor is transmitted from the sensor unit to the reader.

17 Claims, 10 Drawing Sheets

(58) Field of Classification Search
CPC .... G01M 17/013; G01M 17/04; G01M 17/06; G01M 17/08; G01M 1/04; G01M 1/045; G01M 1/12; G01M 3/04; G01M 5/0091; G01M 7/02; G01M 99/00; G01M 99/002; B60C 2019/004; B60C 19/00; B60C 11/243; B60C 11/246; B60C 23/064; B60C 23/0488; B60C 23/0493; B60C 23/20; B60C 23/04; B60C 23/0408; B60C 23/061; B60C 11/24; B60C 13/003; B60C 13/02; B60C 2200/065; B60C 23/0411; B60C 23/0498; B60C 23/06; B60C 23/065; B60C 23/066; B60C 25/005; B60C 25/007; B60C 25/056; B60C 25/138; B60C 99/00; B60C 99/006; B60C 11/0083; B60C 11/0302; B60C 11/0318; B60C 11/0332; B60C 13/001; B60C 2007/005; B60C 2007/107; B60C 2009/2022; B60C 2009/2038; B60C 2011/0033; B60C 2200/06; B60C 23/00; B60C 23/003; B60C 23/0416; B60C 23/0459; B60C 23/0486; B60C 23/0489; B60C 23/0491; B60C 23/0494; B60C 23/08; B60C 23/18; B60C 25/002; B60C 25/0548; B60C 25/0551; B60C 25/132; B60C 3/04; B60C 7/00; B60C 9/20
USPC .................................................. 73/146–146.8
See application file for complete search history.

(56) References Cited

U.S. PATENT DOCUMENTS

| | | |
|---|---|---|
| 7,021,132 B2 | 4/2006 | Nigon |
| 7,161,476 B2 | 1/2007 | Hardman et al. |
| 7,295,103 B2 * | 11/2007 | Muller ................ B60C 23/0408 340/442 |
| 7,739,529 B2 | 6/2010 | Hardman et al. |
| 8,151,127 B2 | 4/2012 | Hardman et al. |
| 8,266,465 B2 | 9/2012 | Hardman et al. |
| 2002/0075145 A1 * | 6/2002 | Hardman ............ B60C 23/0433 340/442 |
| 2002/0126005 A1 * | 9/2002 | Hardman ............ B60C 23/0454 340/442 |
| 2003/0080862 A1 * | 5/2003 | Kranz ................ B60C 23/0433 340/442 |
| 2004/0172180 A1 * | 9/2004 | Bowman ............ B60C 23/0433 701/31.4 |
| 2005/0099283 A1 * | 5/2005 | Johnson ............. B60C 23/0493 340/447 |
| 2006/0025897 A1 * | 2/2006 | Shostak ................ G08G 1/017 701/1 |
| 2014/0368327 A1 * | 12/2014 | Darrer ................ B60C 23/0433 340/447 |
| 2016/0016445 A1 * | 1/2016 | Peine ................ B60C 23/0488 73/146.5 |
| 2016/0290880 A1 | 10/2016 | Lewis et al. |
| 2019/0184763 A1 | 6/2019 | Pulford et al. |
| 2019/0184771 A1 | 6/2019 | Pulford et al. |
| 2019/0187027 A1 * | 6/2019 | Lin ...................... G01M 17/02 |
| 2019/0193479 A1 | 6/2019 | Pulford et al. |
| 2019/0193480 A1 | 6/2019 | Pulford et al. |
| 2019/0270349 A1 * | 9/2019 | Larsen ................ B60C 23/0444 |

FOREIGN PATENT DOCUMENTS

| | | |
|---|---|---|
| EP | 2263889 B1 | 9/2014 |
| EP | 3505336 A1 | 7/2019 |
| JP | 2003159918 A | 6/2003 |
| KR | 101713238 B1 | 3/2017 |
| WO | WO2016144944 A1 | 9/2016 |
| WO | WO2016145309 A1 | 9/2016 |

* cited by examiner

INTEGRATED TIRE SENSOR AND READER SYSTEM

FIELD OF THE INVENTION

The invention relates to tires and monitoring systems for tires. More particularly, the invention relates to electronic sensors that sense various conditions within tires. Specifically, the invention is directed to an integrated sensor and reader system that detects conditions in a tire and employs passive radio frequency to communicate tire condition information.

BACKGROUND OF THE INVENTION

Tires experience many conditions that are beneficial to monitor. Such tires include pneumatic tires, non-pneumatic tires, automotive tires, passenger tires, truck tires, commercial tires, off-the-road tires, aircraft tires, spacecraft tires, and the like. Reference herein is made to a pneumatic passenger tire by way of example, with the understanding that the invention applies to any type of tire.

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

For many modern tires, it is often desirable to mount electronic sensors to the tires either before or after curing. Such sensors enable the temperature, pressure and/or other parameters or conditions of the tire to be continuously monitored during vehicle operation. Data from the sensors is transmitted to a receiver that is in electronic communication with an electronic control system of the vehicle, which may then employ the data to improve the function of an anti-lock brake system (ABS), electronic stability control system (ECS), and the like. In this manner, a sensor and reader are employed together as a system.

While prior art electronic sensor and reader systems are acceptable for many uses, they possess certain disadvantages. For example, sensor and reader systems that can withstand the harsh environment of a tire and communicate data in an accurate and repeatable manner typically have been undesirably expensive. In addition, many sensor and reader systems are limited in configuration, which prevents the system from expanding the number of sensors that can communicate with a single convenient reader.

Other prior art sensor and reader systems do not employ standardized transmission or communication protocols, which creates undesirable cost and complexity. Moreover, some sensor and reader systems that do employ standardized transmission or communication protocols employ only a single protocol, which undesirably limits the capability of the system. Still other prior art sensor and reader systems are powered only by a battery, which undesirably limits the life and transmission capability of the system.

As a result, it is desirable to develop an integrated sensor and reader system that detects and communicates conditions in a tire during vehicle operation and can withstand the harsh environment of a tire, communicates data accurately and repeatably manner in a cost-effective manner, includes a configuration that enables the system to accommodate multiple sensors which can communicate with a reader, employs multiple standardized transmission or communication protocols, and may be powered by means in addition to or other than a battery.

SUMMARY OF THE INVENTION

According to an aspect of an exemplary embodiment of the invention, an integrated tire sensor and reader system includes at least one sensor unit mounted on at least one of a tire and a wheel, and a reader that is disposed remotely from the at least one sensor unit. The at least one sensor unit includes at least one sensor for measuring a parameter of the tire or wheel, and an antenna for communicating with the reader. The at least one sensor unit is configured to receive a radio frequency power signal from the reader and to transmit data to the reader. The reader includes an antenna for transmitting the radio frequency power signal to the at least one sensor unit to actuate the at least one sensor unit. Upon actuation of the at least one sensor unit, the at least one sensor measures the parameter of the tire or wheel, and data from the at least one sensor is transmitted from the at least one sensor unit to the reader.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Radial-ply tire" means a belted or circumferentially-restricted pneumatic tire in which the ply cords which extend from bead to bead are laid at cord angles between about 65 to about 90 degrees with respect to the equatorial plane of the tire.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

An exemplary embodiment of an integrated tire sensor and reader system of the present invention is indicated generally at 10 and is shown in FIGS. 1 through 10. The tire sensor and reader system 10 includes at least one tire-based sensor unit 12 and a reader 14.

Figure 1:
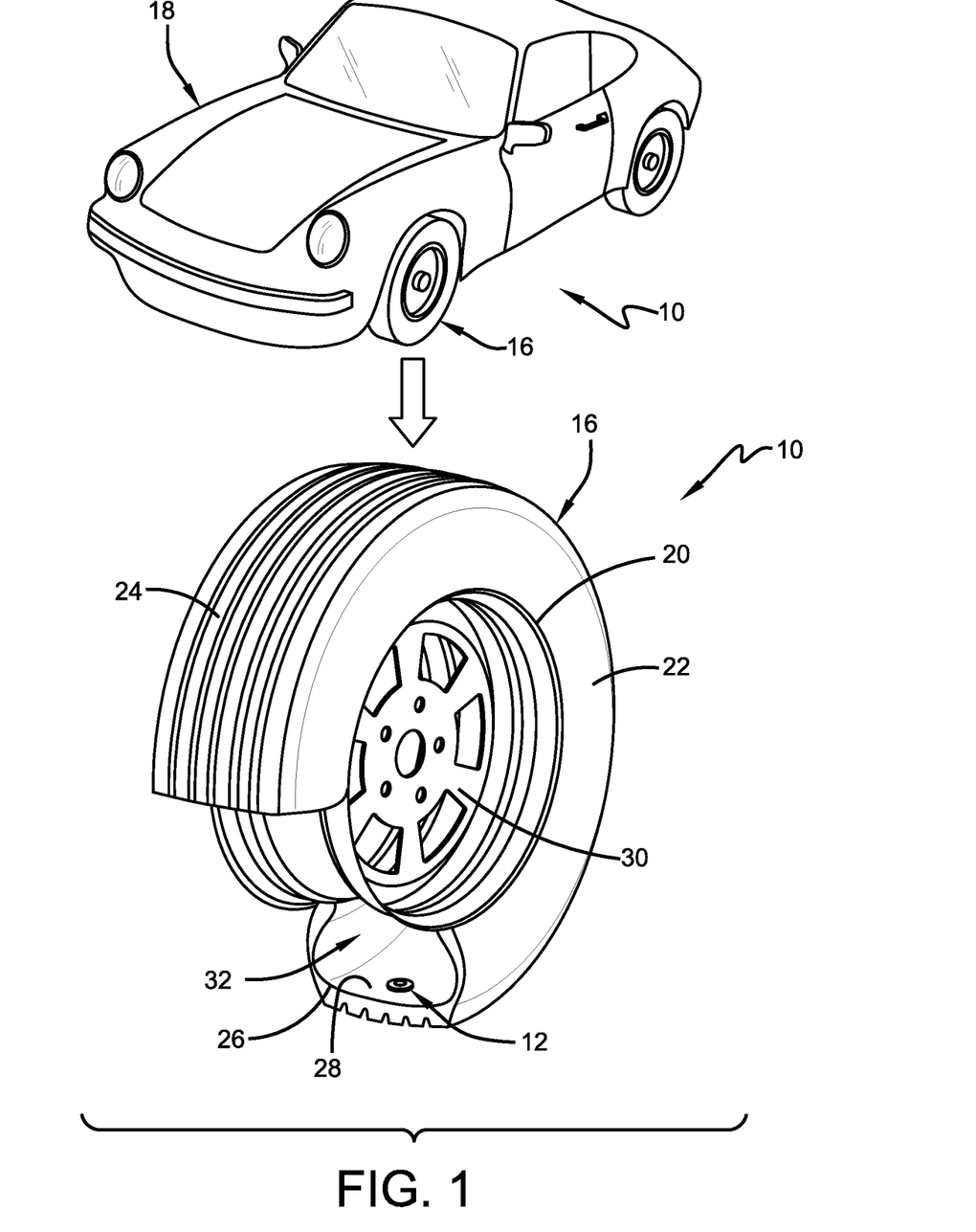
FIG. 1 is a schematic perspective view of a vehicle and tire employing an exemplary sensor unit of the integrated tire sensor and reader system of the present invention.

With particular reference to FIG. 1, the sensor unit 12 preferably is mounted in or on a tire 16 that supports a vehicle 18. By way of example, the tire 16 includes a pair of bead areas 20 (only one shown) and a bead core (not shown) embedded in each bead area. Each one of a pair of sidewalls 22 (only one shown) extends radially outward from a respective bead area 20 to a ground-contacting tread 24. The tire 16 is reinforced by a carcass 26 that toroidally extends from one bead area 20 to the other bead area, as known to those skilled in the art. An innerliner 28 is formed on the inside surface of the carcass 26. The tire 16 is mounted on a wheel 30 in a manner known to those skilled in the art and, when mounted, forms an internal cavity 32 that is filled with a pressurized fluid, such as air.

The sensor unit 12 may be attached to the innerliner 28 by means such as an adhesive and measures certain parameters or conditions of the tire 16, as will be described in greater detail below. It is to be understood that the sensor unit 12 may be attached in such a manner, or to other components of the tire 16, such as between layers of the carcass 26, on or in one of the sidewalls 22, on or in the tread 24, and/or a combination thereof. For the purpose of convenience, reference herein shall be made to mounting of the sensor unit 12 on the tire 16, with the understanding that such mounting includes all such attachment.

In addition, the sensor unit 12 may be attached to the wheel 30 on which the tire 16 is mounted. It is also to be understood that the sensor unit 12 shown in FIG. 1 is by way of example, and that the sensor may be of any size and/or shape. For example, the sensor unit 12 may be a disc-shaped unit as shown, or may be a particulate inclusion type of unit as described in greater detail in U.S. patent application Ser. No. 16/182,869, which is owned by the same Assignee as the instant Application, the Goodyear Tire & Rubber Company, and which is incorporated herein by reference.

Figure 2:
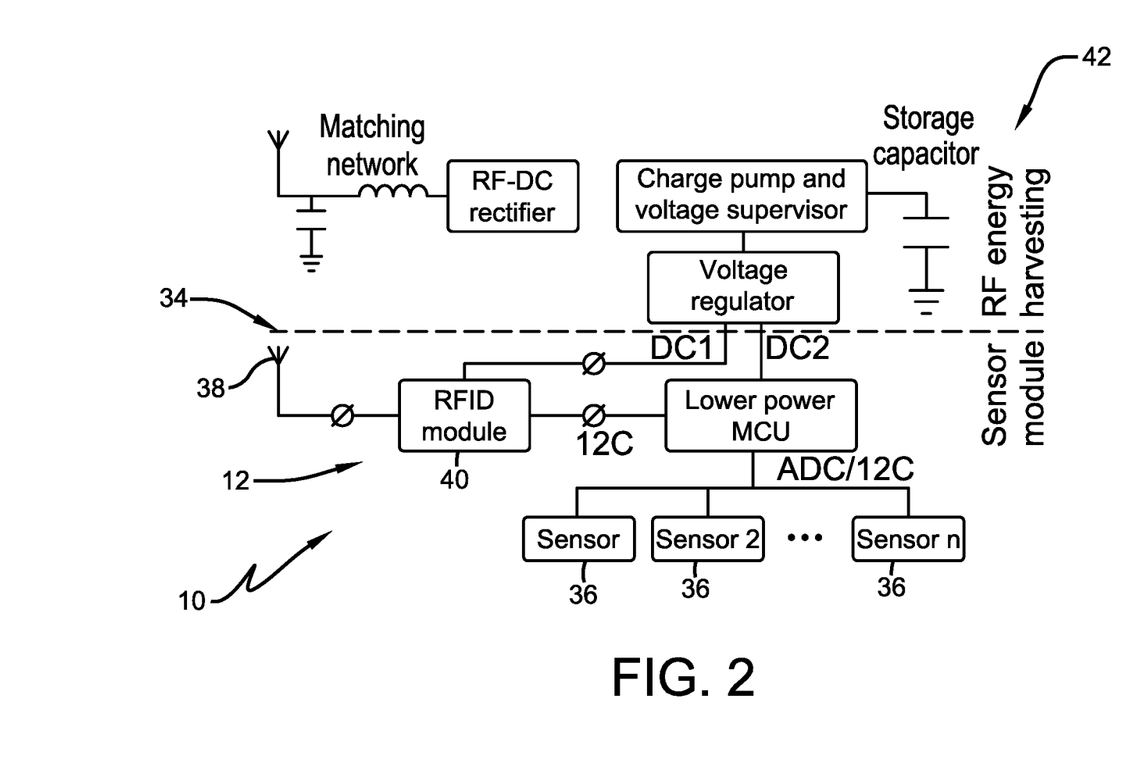
FIG. 2 is a circuit diagram of an exemplary sensor unit of the integrated tire sensor and reader system of the present invention.

Turning now to FIG. 2, the sensor unit 12 preferably includes an integrated circuit 34 that processes and stores information. The sensor unit 12 also includes at least one sensor 36 that is electronically connected to the integrated circuit 34, and may be integrated into the integrated circuit. Of course, multiple sensors 36 may be electronically connected to the integrated circuit 34, and may be integrated into the integrated circuit. The sensor unit 12 preferably includes an antenna 38 for receiving and transmitting a signal to the external reader 14, which will be described in greater detail below. The antenna 38 is also electronically connected to the integrated circuit 34, and may be carried on a substrate with the integrated circuit.

In this manner, the sensor unit 12 includes an integrated circuit 34, at least one sensor 36 and an antenna 38 that are integrated with one another or otherwise electronically connected. The sensor unit 12 may include a modular construction to enable easy electronic connection of multiple sensors 36 or other components. In addition, the sensor unit 12 may include more than one integrated circuit 34.

Moreover, the sensor unit 12 preferably includes a module 40 for storing identification (ID) information for the tire 16. The tire ID information may include manufacturing information for the tire 16, such as: the tire type; tire model; size information, such as rim size, width, and outer diameter; manufacturing location; manufacturing date; a treadcap code that includes or correlates to a compound identification; and a mold code that includes or correlates to a tread structure identification. The tire ID information may also include a service history or other information to identify specific features and parameters of each tire 16, as well as mechanical characteristics of the tire, such as cornering parameters, spring rate, load-inflation relationship, and the like. Such tire identification enables correlation of the parameters measured by the sensors 36 with the specific tire 16 to provide local or central tracking of the tire, its current condition, and/or its condition over time. In addition, global positioning system (GPS) capability may be included in the sensor unit 16 and/or the module 40 to provide location tracking of the tire 16 during transport and/or location tracking of the vehicle on which the tire is installed.

The sensor unit 12 preferably is configured to receive a radio frequency (RF) power signal and/or to transmit an RF data signal using the antenna 38 and the integrated circuit 34. Preferably, the RF signal is an ultra high frequency (UHF) signal in a range of from about 300 megahertz (MHz) to about 3 gigahertz (GHz). In this manner, the sensor unit 12 transmits data measured by the sensors 36 and the tire ID information in the module 40 to the remote reader 14, as will be described in greater detail below. For power, the sensor unit 12 preferably includes a wireless power receiver 42 that is integrated with or coupled to the integrated circuit 34, as will be described in greater detail below. Alternatively, or in addition to the wireless power receiver 42, the sensor unit 12 may include a non-rechargeable battery, rechargeable battery, supercapacitor and/or energy harvesting structure that is integrated with or coupled to the integrated circuit 34.

Figure 3:
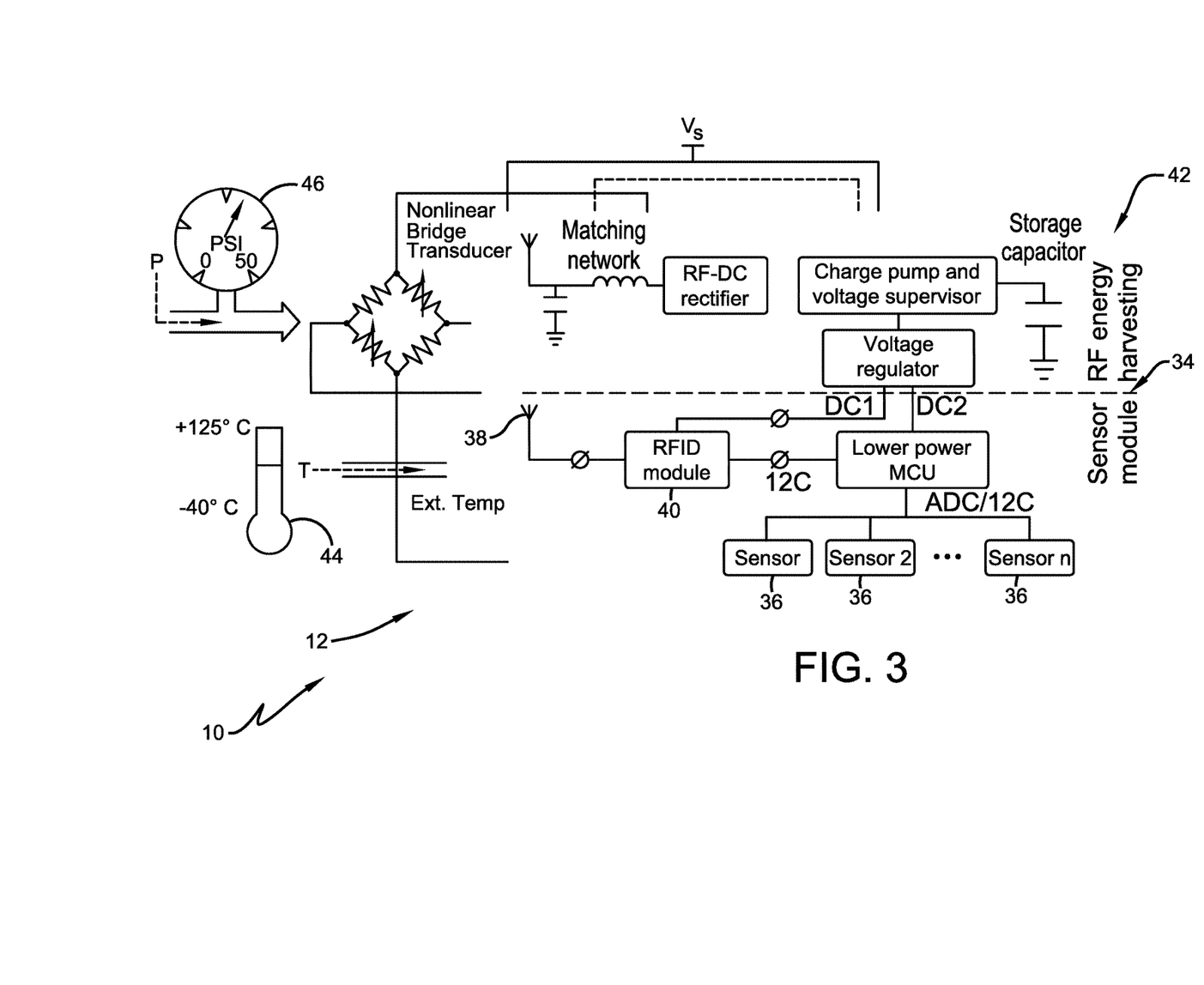
FIG. 3 is a circuit diagram of another exemplary sensor unit of the integrated tire sensor and reader system of the present invention.

Exemplary sensors 36 include tire pressure monitoring system (TPMS) sensors. Referring to FIG. 3, an exemplary configuration of the sensor unit 12 for a TPMS sensor is shown. The sensor unit 12 includes a temperature sensor 44 that is electronically connected to the integrated circuit 34, and may be integrated into the integrated circuit. The temperature sensor 44 measures the temperature within the tire 16 during its use on the vehicle 18. For such measurement, the sensor unit 12 preferably is disposed at a specific location in or on the tire 16 to detect a temperature of specific components of the tire and/or the temperature in the cavity 32. In addition, the temperature sensor 44 and the integrated circuit 34 may track a temperature versus time history at a specific location in or on the tire 16 in order to provide data to predict when tire replacement should occur.

The sensor unit 12 may also include a pressure sensor 46 that is electronically connected to the integrated circuit 34, and may be integrated into the integrated circuit. The pressure sensor 46 measures the pressure in the cavity 32 of the tire 16 during its use on the vehicle 18. As will be described in greater detail below, the use of the temperature sensor 44 and/or the pressure sensor 46 in the sensor unit 12 enables the data measured by each sensor to be communicated to control systems of the vehicle 18 and/or a user of the vehicle.

Figure 4:
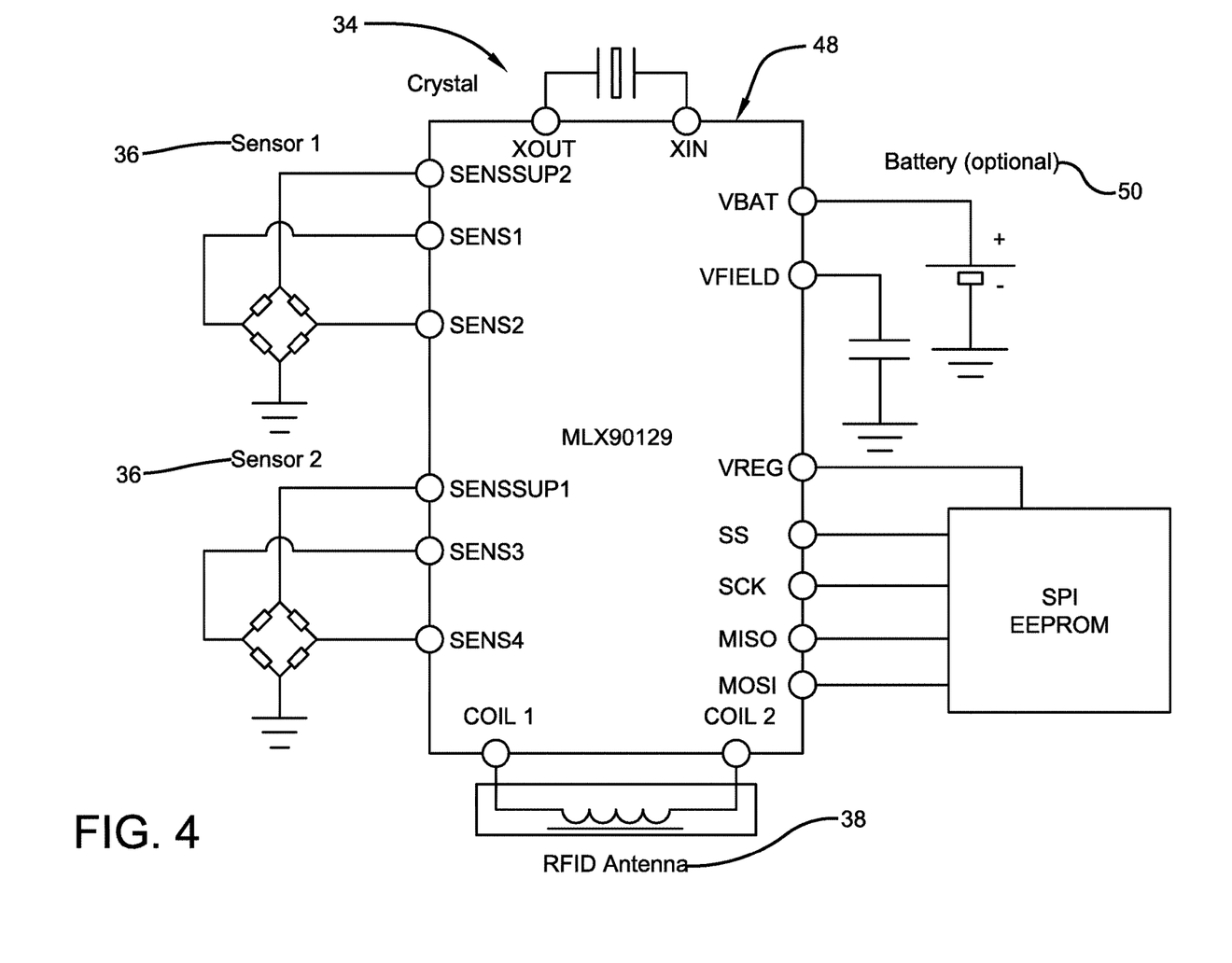
FIG. 4 is a circuit diagram of an exemplary circuit board of the sensor unit of the integrated tire sensor and reader system of the present invention.

The sensor unit 12 is a passive unit. More particularly, the sensor unit 12 remains powered off unit it is actuated by the reader 14, as will be described in greater detail below. An exemplary configuration of the integrated circuit 34 for the passive sensor unit 12 is shown in FIG. 4. The integrated circuit 34 preferably includes a printed circuit board 48, and the sensors 36 and the antenna 38 are electrically connected to the circuit board. An optional battery 50, as described above, may also be electrically connected to the printed circuit board 48.

Exemplary sensors 36 also include tread wear sensors, such as the sensors described in greater detail in U.S. Patent Application Ser. No. 62/608,155, which is owned by the same Assignee as the instant Application, the Goodyear Tire & Rubber Company, and which is incorporated herein by reference. In such a case, the sensor unit 12 may be employed to detect wear of the tire 16 during its use on a vehicle by measuring changes in electrical resistance, temperature and/or pressure as determined by the sensor 36. Such changes provide data indicating the amount of wear of the tread 24 of the tire 16, which may be used to indicate when replacement of the tire is recommended.

Other exemplary sensors 36 include accelerometers and similar acceleration-measuring sensors. For example, the sensors 36 may include three-dimensional (3D) accelerometers, 3D gyroscopes and/or 3D magnetometer sensors. Such sensors 36 measure the change of forces of the tire 16, and may be mounted on the innerliner 28 or the wheel 30. Data measured by such sensors 36 may be communicated from the sensor unit 12 to the reader 14 and to a processor for use in determining tire load, traction coefficient and/or footprint length. Such properties may then be employed by control systems of the vehicle 18, such as vehicle stability control systems and traction control systems, to improve vehicle performance and safety.

Still other exemplary sensors 36 include low-power ultrasound sensors, which measure vertical deflection of the tire 16. The sensors 36 may be disposed on the innerliner 28 or on the wheel 30. By detecting and measuring deflection of the tire 16, a force change, tire vertical stiffness and/or tire load may be determined. Data measured by such sensors 36 may be communicated from the sensor unit 12 to the reader 14 and to a processor for use in determining load, traction coefficient and/or footprint length. Such properties may then be employed by control systems of the vehicle 18, such as vehicle stability control systems and traction control systems, to improve vehicle performance and safety. Moreover, an ultrasound sensor may be disposed in a groove on the tread 24 to detect a change in sensor-to-ground distance and thus measure tire wear, and/or may be employed for diagnostic monitoring of air pressure in the cavity 32 to detect pressure loss or tire structure property changes.

Yet other exemplary sensors 36 include strain or force indicators. For example, a strain gauge may be disposed in or on the tread 24 or the sidewall 22. By measuring the strain in the tread 24, the sensor unit 12 may provide data indicating road conditions, and by measuring the strain in the sidewall 22, the sensor unit may provide data indicating the load on the tire 16. This data can be communicated to the vehicle stability and/or braking systems to provide improved control of the vehicle, and can also be used for monitoring or tracking driving behavior. Exemplary strain gauges include flexible printed resistance-based strain gauges, piezoelectric-based strain/force gauges and electroactive polymer-based strain/force gauges. When piezoelectric-based strain/force gauges and electroactive polymer-based strain/force gauges are employed, the sensor unit 12 may store or harvest energy from the piezoelectric or electroactive polymer in a capacitor. Such energy storage may enable the sensor unit 12 to activate and pro-actively contact the reader 14.

Figure 5:
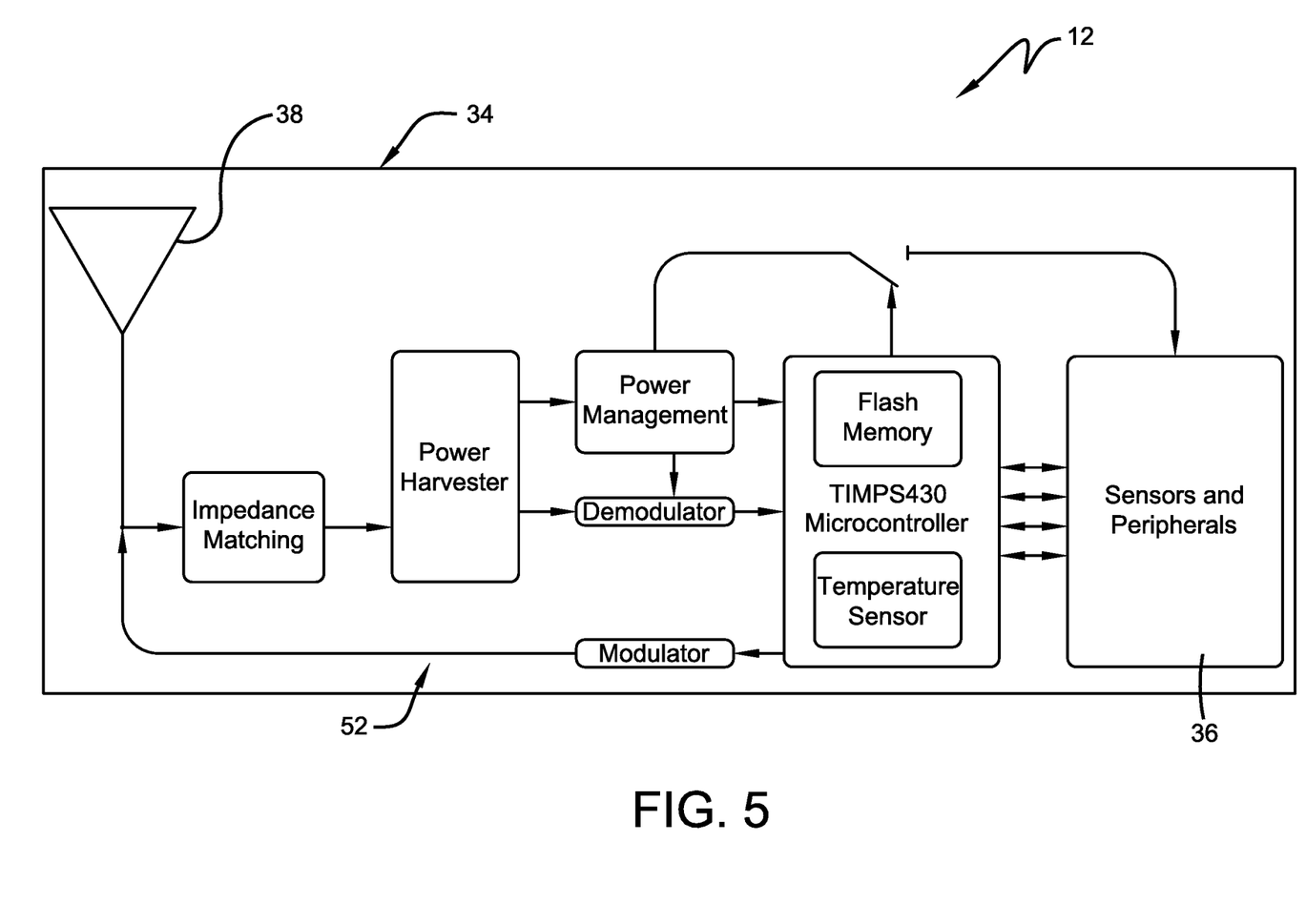
FIG. 5 is a schematic diagram of an exemplary converter of the integrated tire sensor and reader system of the present invention.

Turning now to FIG. 5, to enable the passive sensor unit 12 to include easy communication with a variety of sensors 36, the integrated circuit 34 preferably includes a converter 52. More particularly, the converter 52 is an analog-to-digital converter that receives an analog signal from any sensors 36 which output data in analog signal form, and converts the signal into digital form for storage in the memory of the identification module 40 and/or transmission. When different types of sensors 36 are employed with a single reader 14, multiple converters 52 may be employed in the sensor unit 12.

Figure 6:
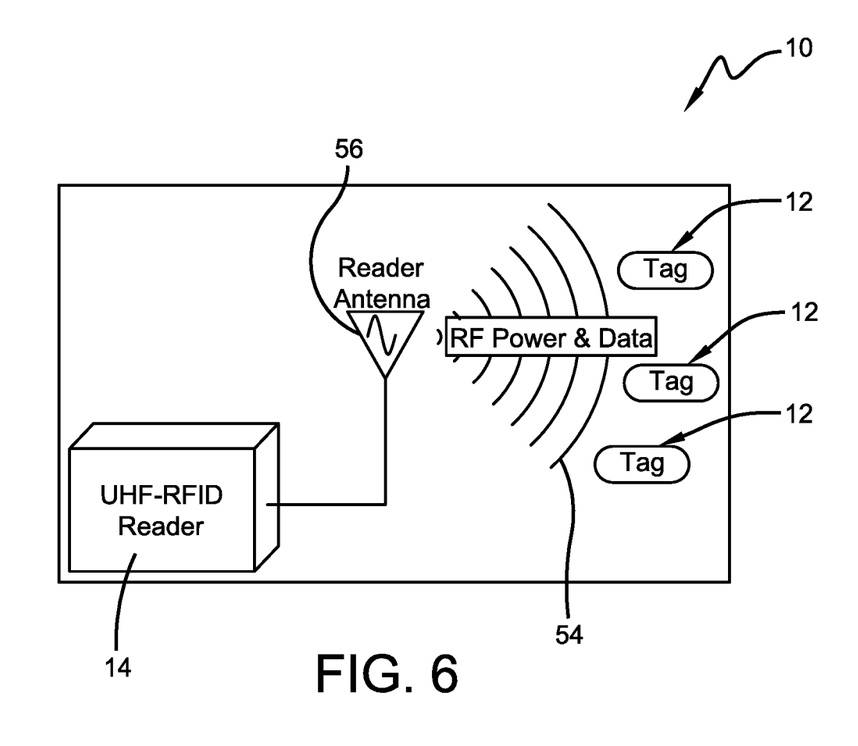
FIG. 6 is a schematic diagram of an exemplary reader and sensor units of the integrated tire sensor and reader system of the present invention.

Referring now to FIG. 6, the sensor unit 12 preferably is a passive RF component that is actuated by the external reader 14. More particularly, the sensor unit 12, including the integrated circuit 34 and the sensors 36, remain in a passive state. When the reader 14 sends a predetermined wireless signal 54 through a reader antenna 56 to the sensor unit 12, the sensor unit antenna 38 (FIG. 2) receives the signal and actuates the integrated circuit 34. Each sensor 36 takes its respective measurements, and data from the sensor measurements is communicated to the integrated circuit 34. The data is stored on a memory unit of the integrated circuit 34 and transmitted wirelessly by the antenna 38 from the sensor unit 12 to the reader antenna 56 and the reader 14.

After the data is sent from the sensor unit 12 to the reader 14, the sensor unit preferably returns to its passive state. Each time that the reader 14 sends the signal 56 to the sensor unit 12, the sensor unit is actuated as described above. In this manner, multiple sensor measurements may be taken and stored without an ongoing power requirement by the sensor unit 12. Optionally, the sensor unit 12 may include a micro-battery 50 or an energy harvester to extend the transmission range of the sensor unit and/or to periodically actuate the sensor unit to pro-actively contact the reader 14. As shown in FIG. 6, multiple sensor units 12 may be in communication with and actuated by a single reader 14. As will be described in greater detail below, the reader 14 may be mounted to the vehicle 18 for proximity with each sensor unit 12, such as on the vehicle body on a hub of the wheel 30.

In order to communicate with multiple sensor units 12, the reader 14 preferably employs ultra-high radio frequency transmission for the signal 54, as described above, with multiple communication protocols. For example, the reader 14 may employ a Wi-Fi wireless communication protocol, an internet of things (IoT) network protocol and/or a long-term evolution (LTE) communication protocol. By providing standardized communication using such protocols and ultra-high radio frequency communication, multiple sensors 36 of different types may transmit readable data from each sensor unit 12 to the reader 14 at a high reading rate, such as up to about fifty (50) to about seven hundred fifty (750) sensor units per second.

Figure 7:
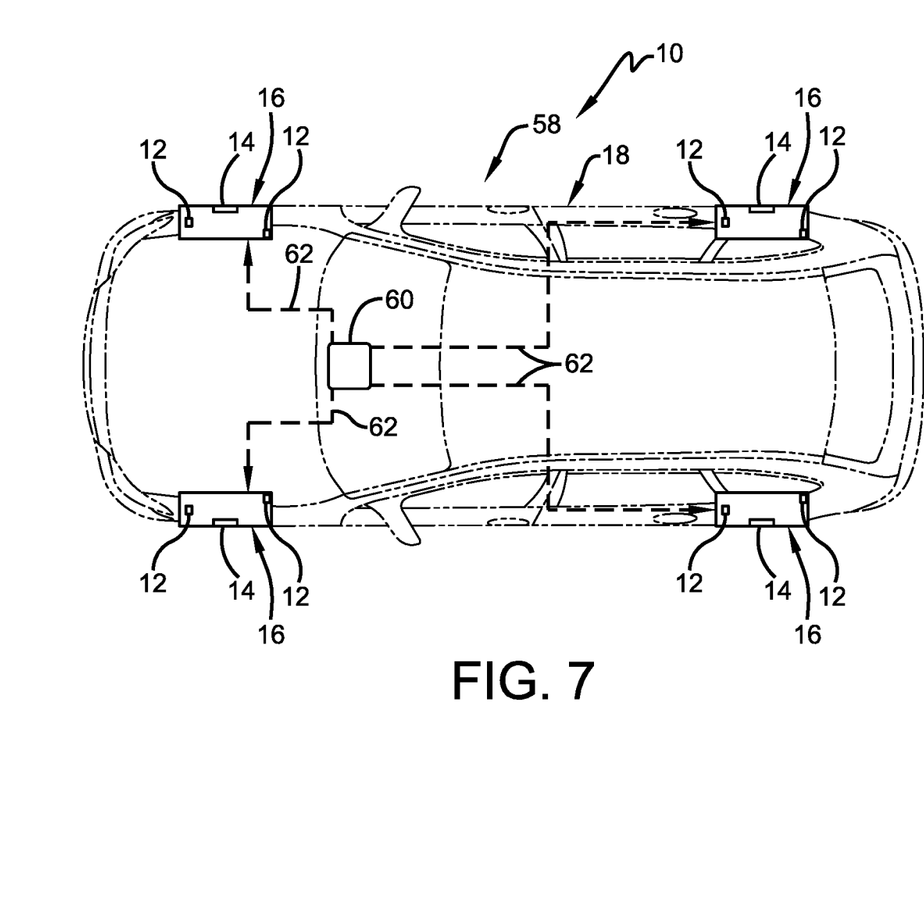
FIG. 7 is a schematic plan view of a vehicle and tires employing a first exemplary configuration of the integrated tire sensor and reader system of the present invention.

Turning to FIG. 7, a first exemplary configuration of the integrated tire sensor and reader system 10 of the present invention is shown on the vehicle 18 and indicated generally at 58. In this configuration 58, one or more sensor units 12 may be mounted on each tire 16, or on the respective wheel 30 on which each tire is mounted. As described above, each sensor unit 12 preferably is a passive RFID unit.

A reader 14 is disposed proximate each tire 16 or wheel 30, and preferably is mounted on each tire or wheel. Each reader 14 communicates with the sensor units 12 that are disposed on the same tire 16 or wheel 30 as the reader. In this manner, each reader 14 is based upon a specific tire or wheel position and communicates with sensor units 12 at that position. The passive sensor units 12 at each tire or wheel position are actuated by their respective reader 14. To power each reader 14, a vehicle-mounted power unit 60 may be provided, which preferably is powered by the electrical system of the vehicle 18. The power unit 60 is selectively electrically connected to each reader 14, and preferably is a wireless power transmitter that employs an electromagnetic field or signal 62 to transfer a voltage to the readers. Each reader 14 includes a receiver that receives the signal 62 from the power unit 60, thereby enabling the power unit to wirelessly charge the readers.

In this manner, a central vehicle-mounted power unit 60 provides power to each reader 14, which in turn actuates each sensor unit 12. The first exemplary configuration 58 of the integrated tire sensor and reader system 10 enables the system to be installed on existing vehicles as a retrofit. More particularly, the single power unit 60 may easily be added to the vehicle 18, while the sensor units 12 and readers 14 are added to the tires 16 and/or wheels 30. In addition, the power unit 60 may be employed to charge other wireless electronics inside in proximity with the vehicle 18, such as a user's phone.

Figure 8:
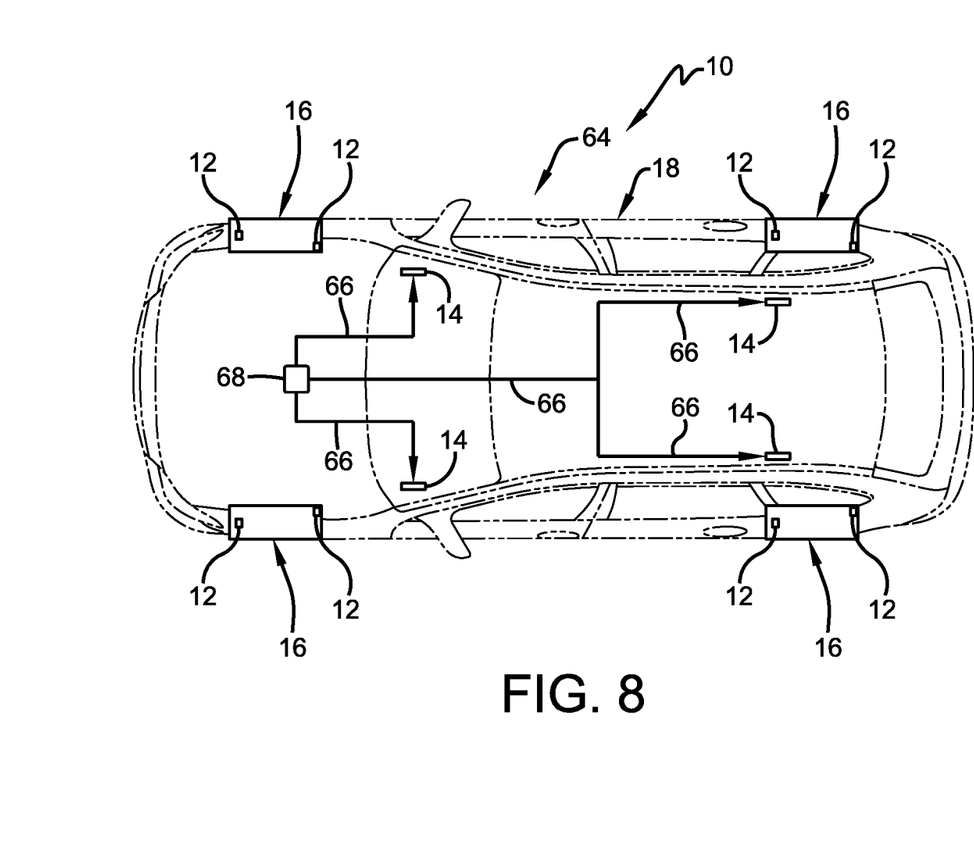
FIG. 8 is a schematic plan view of a vehicle and tires employing a second exemplary configuration of the integrated tire sensor and reader system of the present invention.

Referring now to FIG. 8, a second exemplary configuration of the integrated tire sensor and reader system 10 of the present invention is shown on the vehicle 18 and indicated generally at 64. In this configuration 64, one or more sensor units 12 may be mounted on each tire 16, or on the respective wheel 30 on which each tire is mounted. As described above, each sensor unit 12 preferably is a passive RFID unit.

A reader 14 is mounted to the vehicle 18 near each tire 16 or wheel 30. Each reader 14 communicates with the sensor units 12 that are disposed on the nearest tire 16 or wheel 30. In this manner, each reader 14 is based upon a specific tire or wheel position and communicates with sensor units 12 at that position. The passive sensor units 12 at each tire or wheel position are actuated by their respective reader 14. Each reader 14 may be powered by wires 66 which are connected to the electrical system of the vehicle 18 through a wired connection 68. In this manner, the electrical system of the vehicle 18 preferably provides hard-wired power to each reader 14, which in turn actuates each sensor unit 12. The second exemplary configuration 64 of the integrated tire sensor and reader system 10 enables the system to be installed on new vehicles in an economical manner.

Figure 9:
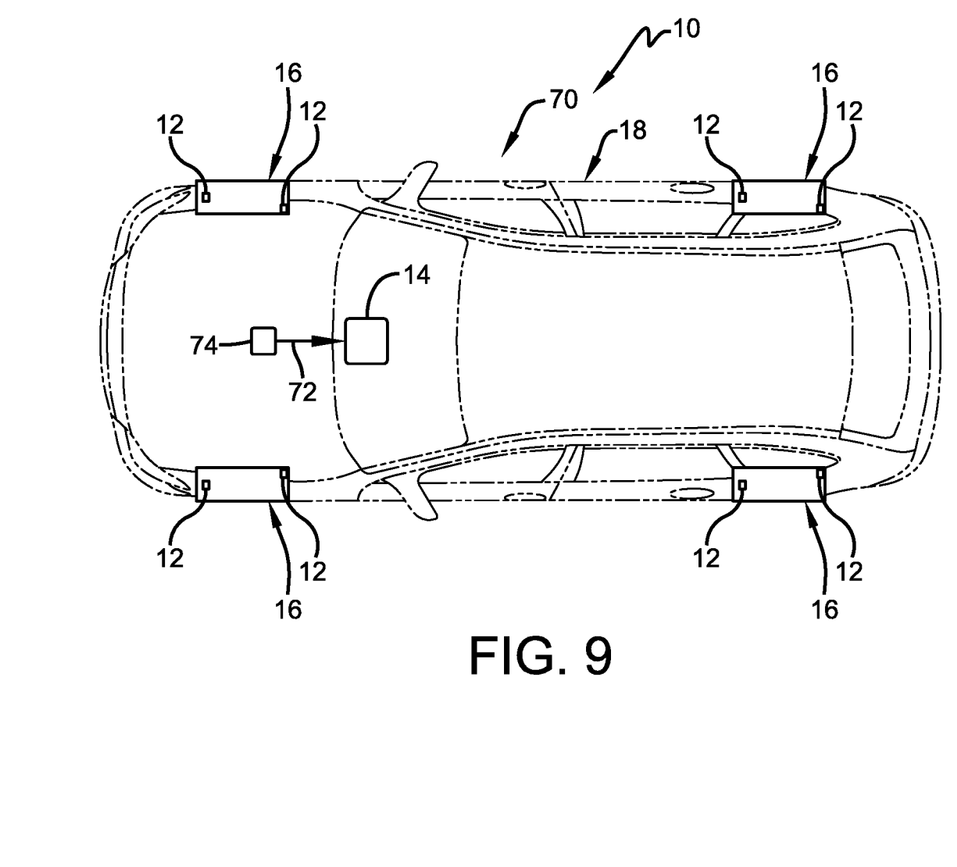
FIG. 9 is a schematic plan view of a vehicle and tires employing a third exemplary configuration of the integrated tire sensor and reader system of the present invention.

With reference now to FIG. 9, a third exemplary configuration of the integrated tire sensor and reader system 10 of the present invention is shown on the vehicle 18 and indicated generally at 70. In this configuration 70, one or more sensor units 12 may be mounted on each tire 16, or on the respective wheel 30 on which each tire is mounted. As described above, each sensor unit 12 preferably is a passive RFID unit.

A single reader 14 is mounted to the vehicle 18 at a convenient central location. The reader 14 communicates with the sensor units 12 disposed on all of the tires 16 and/or wheels 30. In this manner, the reader 14 is a central reader that actuates all of the passive sensor units 12. The reader 14 may be powered by wires 70 which are connected to the electrical system of the vehicle 18 through a wired connection 72. In this manner, the electrical system of the vehicle 18 preferably provides hard-wired power to a single reader 14, which in turn actuates each sensor unit 12. The third exemplary configuration 70 of the integrated tire sensor and reader system 10 enables the system to be installed on new vehicles in an economical manner, and the use of a single reader 14 provides easier and thus improved data processing capability.

The reader 14 may also be disposed on an infrastructure separate from the vehicle 18. For example, the reader 14 may be installed on a horizontal surface over which the vehicle 18 is driven, or a vertical structure by which the vehicle passes, to actuate each sensor unit 12. Use of the reader 14 in a location that is separate from the vehicle 18 may be useful when large-scale reading of sensor units 12 is desired, such as at service locations and/or for fleets of vehicles. Such locations include an entrance to a fleet yard or lot, a parking garage, a gas station and/or a service station. In addition, the reader 14 may be disposed on an infrastructure such as a radio mast to actuate sensor units 12 within a pre-defined geographic area without the need to drive the vehicle 18 over or by a structure. Such geographic areas include limited geographic spaces for vehicles 18, such as a parking lot or deck, or a larger geographic region.

Figure 10:
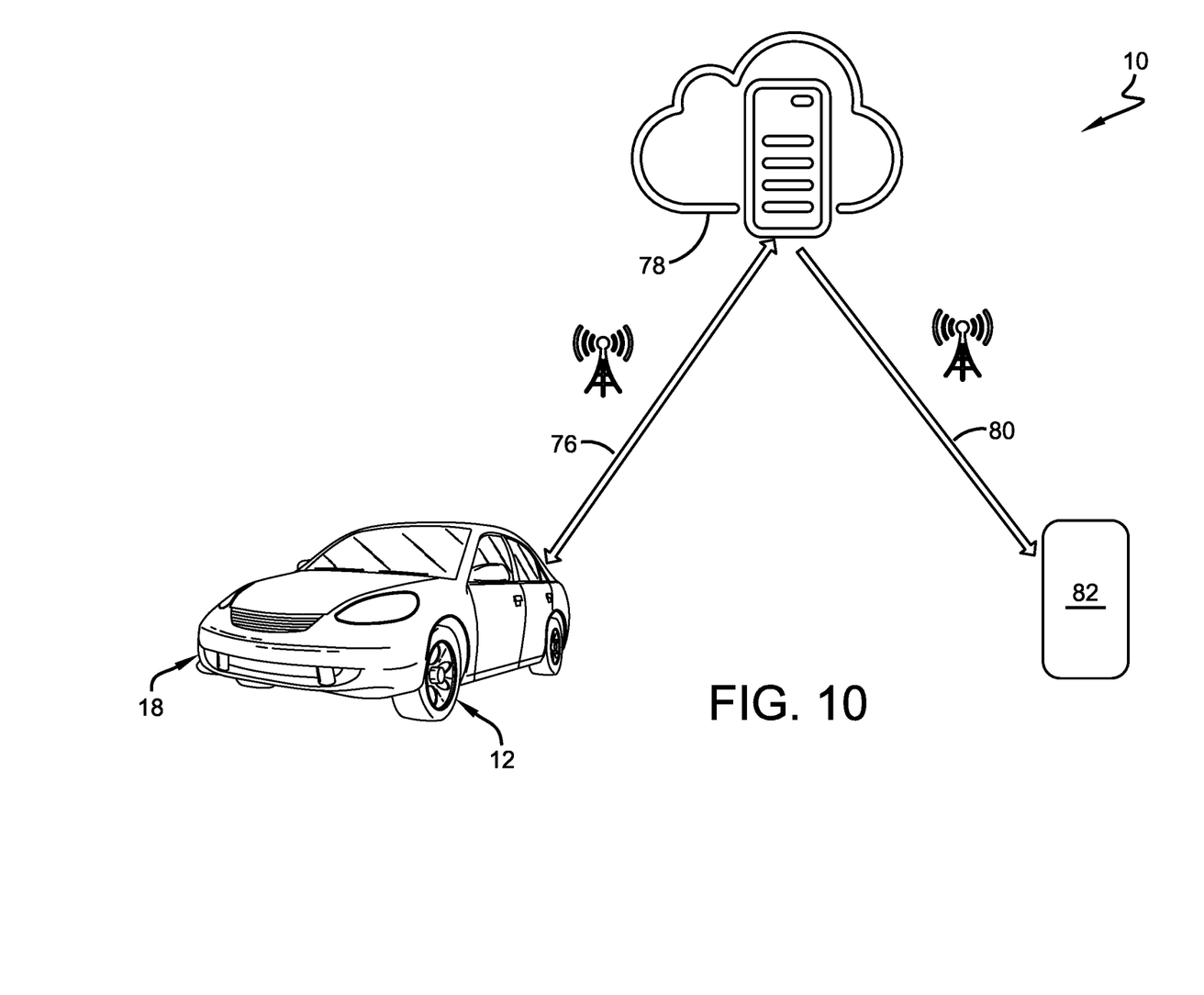
FIG. 10 is a schematic representation of an exemplary implementation of communication and information display of an exemplary embodiment of the integrated tire sensor and reader system of the present invention.

Turning to FIG. 10, the tire sensor and reader system 10 also includes communication of data to vehicle systems, a user of the vehicle 18 and/or to a central location for processing. More particularly, while each sensor unit 12 is passive and actuated by the reader 14, the reader is in electronic communication with the electronic control system of the vehicle 18. Thus, when the reader 14 receives data from the sensor units 12, the reader may transmit the data through the electronic control system of the vehicle 18 to specific vehicle control systems, such as the anti-lock braking system (ABS), electronic stability control system (ECS), and the like.

Through electronic communication with the electronic control system of the vehicle 18, the data from the reader 14 may be wirelessly transmitted 76 from the vehicle to a remote server 78, such as a cloud-based server. The remote server 78 may enable collection and central review of measurements from the sensor units 12. In addition, selected data may be wirelessly transmitted 76 from the server 100 back to specific vehicle control systems, and/or may be wirelessly transmitted 80 to a device 82 for display that is accessible to a user of the vehicle 18, such as a smartphone.

In this manner, the tire sensor and reader system 10 of the present invention provides an integrated sensor and reader system that detects and communicates conditions in a tire during vehicle operation, and withstands the harsh environment of a tire. The system 10 also communicates data accurately and repeatably in a cost-effective manner. The system 10 further includes a configuration that enables multiple sensors 12 to communicate with a reader 14, and which employs multiple standardized transmission or communication protocols. As described above, the system 10, and specifically the sensors 12, may be powered by means other than or in addition to a battery. Therefore, the tire sensor and reader system 10 of the present invention provides a simplified sensor-to-reader communication configuration that enables easy and dependable transfer of data from the sensors 12 to the reader 14 and to vehicle control systems, a central review location and/or a vehicle user.

The present invention also includes a method of providing a tire sensor and reader system 10 on a vehicle 18. The method includes steps in accordance with the description that is presented above and shown in FIGS. 1 through 10.

It is to be understood that the structure of the above-described the tire sensor and reader system 10 may be altered or rearranged, or components or steps known to those skilled in the art omitted or added, without affecting the overall concept or operation of the invention. For example, the sensor units 12 may be disposed in any location in or on the tire 16 and/or the wheel 30, any number of sensor units and readers 14 may be employed, and other electronic structures may be connected to or integrated into the sensor unit and/or the reader.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. An integrated tire sensor and reader system, the system comprising:
    a plurality of sensor units, each sensor unit being mounted on at least one of a tire and a wheel;
    a reader disposed remotely from the plurality of sensor units;
    each sensor unit in the plurality of sensor units including at least one sensor for measuring a parameter of the tire or wheel, and an antenna for communicating with the reader, each sensor unit being configured to receive a radio frequency power signal from the reader and to transmit data to the reader;
    the reader including an antenna for transmitting the radio frequency power signal to each sensor unit in the plurality of sensor units to actuate each sensor unit, wherein upon actuation of each sensor unit, the at least one sensor in each sensor unit measures the parameter of the tire or wheel, and data from the at least one sensor is transmitted from each sensor unit to the reader; and
    the reader employing ultra-high radio frequency transmission with multiple communication protocols, the multiple communication protocols enabling transmission of data between each one of the sensor units and the reader, wherein the protocols include at least one of a Wi-Fi wireless communication protocol, an internet of things (IoT) network protocol and a long-term evolution (LTE) communication protocol.

2. The integrated tire sensor and reader system of claim 1, wherein the radio frequency power signal and the communication signal between the reader and each sensor unit in the plurality of sensor units is an ultra high frequency signal in a range of from about 300 megahertz to about 3 gigahertz.

3. The integrated tire sensor and reader system of claim 1, wherein each sensor unit in the plurality of sensor units includes a module for storing identification information for the tire, and the identification information is transmitted from each sensor unit to the reader.

4. The integrated tire sensor and reader system of claim 1, wherein each sensor unit in the plurality of sensor units further comprises at least one of a non-rechargeable battery, rechargeable battery, supercapacitor and/or energy harvesting structure.

5. The integrated tire sensor and reader system of claim 1, wherein the at least one sensor of each sensor unit in the plurality of sensor units includes at least one of tire pressure monitoring system sensor, a temperature sensor, a pressure sensor, a tread wear sensor, an accelerometer, a low-power ultrasound sensor, and a strain indicator.

6. The integrated tire sensor and reader system of claim 1, wherein each sensor unit in the plurality of sensor units further comprises an analog-to-digital converter to receive an analog signal from the at least one sensor and convert the signal into digital form.

7. The integrated tire sensor and reader system of claim 1, wherein the reader is mounted on the tire or wheel on which each sensor unit in the plurality of sensor units is mounted.

8. The integrated tire sensor and reader system of claim 7, wherein the reader is powered by a vehicle-mounted power unit.

9. The integrated tire sensor and reader system of claim 8, wherein the power unit includes a wireless power transmitter.

10. The integrated tire sensor and reader system of claim 1, wherein the reader is mounted on a vehicle.

11. The integrated tire sensor and reader system of claim 10, wherein the reader is powered by wires connected to the electrical system of the vehicle.

12. The integrated tire sensor and reader system of claim 10, wherein the reader is mounted near the tire or wheel on which the at least one sensor unit is mounted.

13. The integrated tire sensor and reader system of claim 10, wherein the reader is mounted in a central location.

14. The integrated tire sensor and reader system of claim 1, wherein the reader is disposed on an infrastructure separate from the vehicle.

15. The integrated tire sensor and reader system of claim 1, wherein:
    the plurality of sensor units includes a first sensor unit mounted on a first one of at least one of a tire and a wheel;
    the plurality of sensor units includes a second sensor unit mounted on a second one of at least one of a tire and a wheel;
    the reader is a first reader and is in communication with the first sensor unit; and
    a second reader is in communication with the second sensor unit.

16. The integrated tire sensor and reader system of claim 1, wherein the reader transmits data from each sensor unit in the plurality of sensor units to at least one of an electronic control system of a vehicle and a remote server.

17. The integrated tire sensor and reader system of claim 16, wherein the data is transmitted to a display device accessible to a user of the vehicle.

* * * * *